United States Patent [19]

Vershbow

[11] Patent Number: 4,799,606
[45] Date of Patent: Jan. 24, 1989

[54] DISH DISPENSING DEVICE

[75] Inventor: Daniel R. Vershbow, West Newton, Mass.

[73] Assignee: Servolift/Eastern Corporation, Boston, Mass.

[21] Appl. No.: 80,975

[22] Filed: Aug. 3, 1987

[51] Int. Cl.$^4$ ............................................. A47F 1/04
[52] U.S. Cl. ................................... 221/280; 221/307; 221/311
[58] Field of Search ............... 221/311, 279, 280, 226, 221/310, 307, 312 R, 312 A, 312 B, 312 C; 312/71, 42, 50, 60, 61, 187, 193; 211/41, 59.3, 59.2, 51; 414/117, 118; 206/556

[56] References Cited

U.S. PATENT DOCUMENTS

| | | | |
|---|---|---|---|
| 2,522,090 | 9/1950 | Brill et al. | 62/89.5 |
| 2,739,862 | 3/1956 | Gibbs et al. | 312/71 |
| 2,980,289 | 4/1961 | Pick | 221/279 |
| 3,351,741 | 11/1967 | Shelley | 219/385 |
| 3,436,525 | 4/1969 | Stanford | 219/385 |
| 3,493,725 | 2/1970 | MacKay | 219/385 |
| 3,565,500 | 2/1971 | Shelley | 312/71 |
| 3,567,293 | 3/1971 | Saleman | 312/71 |
| 3,642,170 | 2/1972 | Shelley | 221/279 X |
| 3,664,546 | 5/1972 | Shelley | 221/311 X |
| 3,738,722 | 6/1973 | Kooiman | 312/71 |
| 3,767,082 | 10/1973 | House | 221/279 |
| 3,840,146 | 10/1974 | Bodek | 221/310 X |
| 3,861,563 | 1/1975 | Lisbin et al. | 221/279 |
| 3,863,576 | 2/1975 | Olsson | 108/136 |
| 3,900,133 | 9/1975 | Lisbin et al. | 221/280 |
| 3,949,190 | 4/1976 | Landry | 219/385 |

Primary Examiner—Joseph J. Rolla
Assistant Examiner—David H. Bollinger
Attorney, Agent, or Firm—Kenway & Crowley

[57] ABSTRACT

A dispenser of light-weight articles such as plates, trays, dishes, or the like which includes a storage tube for a stack of the articles to be dispensed, a resilient member disposed beneath the stack for urging the stack upwardly, a stop for holding the stack in place and fanning the topmost articles to permit individual dispensing. The stop is fully deflectable downwardly to permit loading and deflectable only a limited amount upwardly to facilitate individual article dispensing.

4 Claims, 1 Drawing Sheet

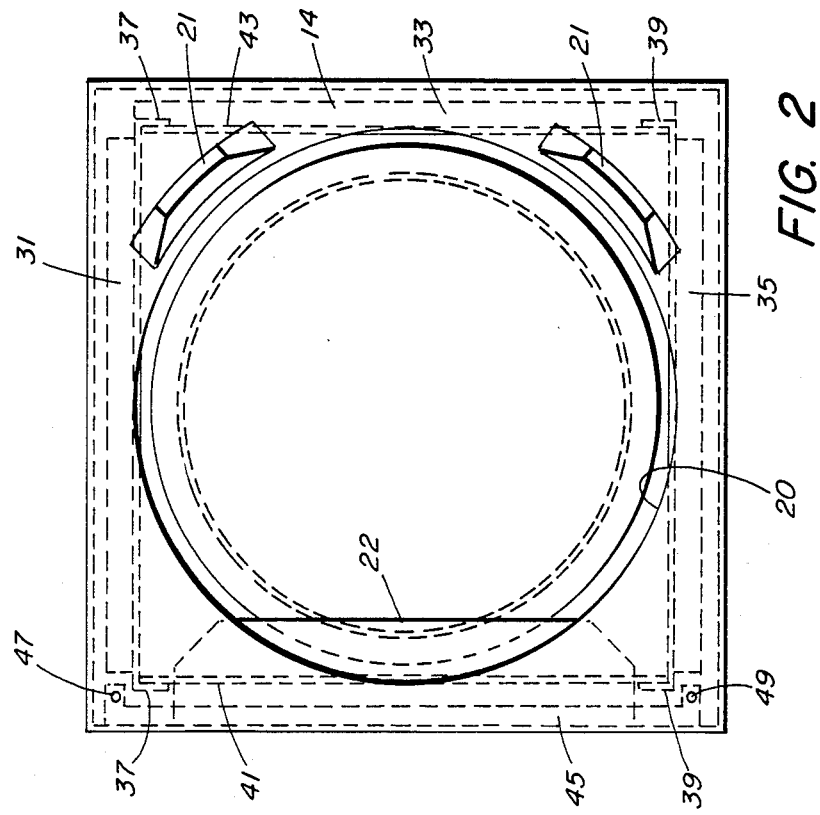
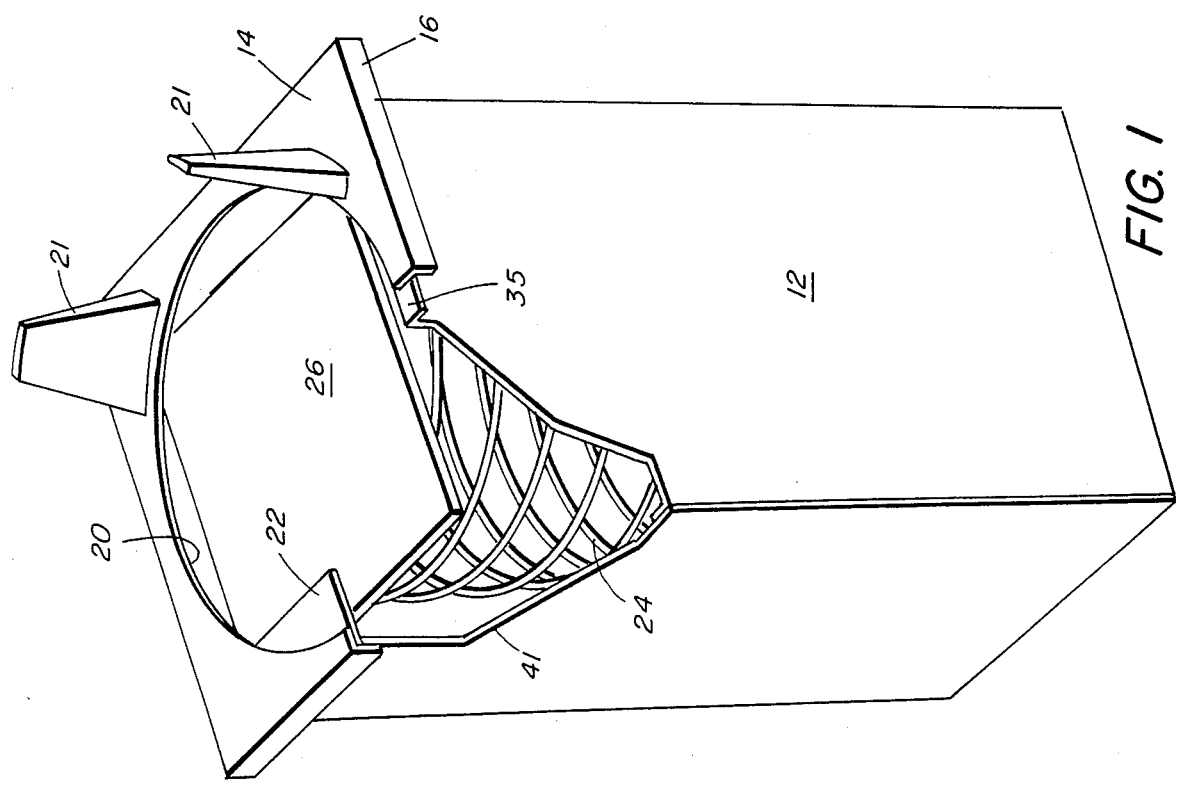

DISH DISPENSING DEVICE

BACKGROUND OF THE INVENTION

This invention relates in general to the dispensing of individual articles from the top of a stack of such articles. More particularly, the invention relates to the dispensing one at a time of closely stacked or nested articles such as disposable plates made of paper or plastic.

Automatic dispensers of food service articles such as dishes, plates, trays, saucers, and the like are commonplace in restaurants, cafeterias, hospitals, and other institutions where it is necessary to serve food quickly and efficiently to large numbers of people. Dispensers have been designed for installation in counters and in serving stations as well as in portable carts or carriers. The general design objective in all such dispensers is to make available conveniently at hand the top article of a stored stack of similar articles. As the top article is removed, a biasing mechanism generally in the form of a spring elevates the stack and the next article atop the stack takes the place of the one dispensed. Most such dispensers are equipped with levelling or balancing mechanisms which are adjustable to maintain the top article in a position where it is easily available irrespective of the number of articles remaining in the stack.

Although such dispensers and levelling mechanisms have been generally satisfactory when used in connection with conventional trays, dinnerware, crockery, or the like, they are not at all suitable when the articles being dispensed are relatively thin and light-weight. Items such as disposable paper or plastic plates are particularly troublesome. Most of the problems encountered stem from the tendency of the disposable plates to nest tightly together and to be difficult to separate individually from the top of the stack. Difficulties have also been encountered in loading the disposable articles against the force of the biasing means in the elongated storage tube normally used to contain the stacked column of articles.

Accordingly, it is the primary object of the present invention to facilitate the dispensing of thin, light-weight articles.

Another object of the present invention is to avoid difficulty in separating a single thin article from the top of a stack of similar articles.

Still another object of the present invention is to modify the top of a dispenser to permit easy loading of a stack of thin disposable articles into an elongated storage tube containing a biasing mechanism.

Still another object of the present invention is to provide a dispenser of disposable plates in which a simple flexible member is mounted at the top of the dispenser to deflect freely for loading of the dispenser.

Yet another object is to provide a stop at the top of the dispenser which serves to separate or fan the uppermost ones of a stack of disposable plates as they emerge from the dispenser.

SUMMARY OF THE INVENTION

The present invention follows the prior art to the extent that it utilizes an elongated vertical storage tube to contain a stack of generally horizontally disposed articles and a bias device such as a compression spring arranged axially within the tube to urge the stack of articles in an upward direction. It further involves a specially designed arrangement adjacent the top of the dispenser which makes it particularly advantageous for the dispensing of relatively thin light weight articles. The invention is readily adaptable to the dispensing of items of chinaware and the like, but an embodiment most useful in dispensing light-weight articles such as disposable plates will be described. Specifically, attached to the top of the dispenser body is a sturdy flange which is larger than the body and which contributes to the structural integrity of the dispenser. The flange may be generally square in shape and have an opening through which the dispenser tube may be loaded with a stack of articles. The opening conforms in shape to that of the articles and a strip of special flexible plastic is mounted to block a small area of the opening. The location of a substantial portion of the strip under the flange limits its deflection in an upward direction. Beneath the plastic strip, however, a surface of the dispenser side is cut back sufficiently to permit relatively free deflection of the plastic strip in a downward direction during loading of a stack of articles.

Because the body or elongated storage tube of the dispenser for containing the stack of plates is designed to depend from the flange, it may be dropped into a counter opening, for example. A biasing device such as a cylindrical compression spring having end plates is disposed within the elongated tube and normally serves to urge the stack of articles upwardly. As indicated above, the dispenser is loaded by pushing a stack of articles such as plates through the hole in the flange into the elongated tube against the pressure of the spring. The plastic strip easily deflects downwardly to permit the plastic or paper articles to be loaded. When the stack is released, the spring urges the stack upwardly until the topmost article reaches and is restrained by the plastic strip. The plastic strip is so shaped and located that it extends into and occupies an area overlying or within the opening and is effective only on the rim of the topmost article which it contacts. The opposite rim area of the topmost article is not so restrained and it and several underlying articles are free to separate and fan angularly upward. Thus, the topmost article may easily be grasped and pulled horizontally or even at an upward angle to the horizontal to remove that article. The flexibility of the plastic strip permits this withdrawal of the top article without damage and the next uppermost article atop the stack moves into the position vacated by the topmost article.

For a better understanding of the present invention, together with other features and advantages, reference should be made to the following description of a preferred embodiment which should be read in connection with the appended drawing in which:

BRIEF DESCRIPTION OF DRAWINGS

FIG. 1 is a perspective view of a dispenser built in accordance with the present invention;

FIG. 2 is a top view of the dispenser of FIG. 1;

DESCRIPTION OF PREFERRED EMBODIMENT

In FIG. 1 there may be seen a dispenser having a square storage tube 12 of great enough depth to accommodate a stack of articles in sufficient numbers to satisfy the needs of a serving operation with only occasional replenishment. The square tube 12 is preferably made of light-gauge stainless steel. Also made of stainless steel of somewhat heavier gauge is a square flange 14 which is attached by conventional means to the top of the tube 12. The flange 14 has depending edges 16 which add to its rigidity and permit it to serve as a support frame from which the entire unit can hang through an opening cut in a surface such as a counter. An opening is formed centrally through the flange of shape conforming to that of the articles being dispensed. A round hole 20 of a diameter sufficient to permit the passage of round plates is shown here. A pair of vertical guide posts 21 are mounted on the flange 14 to aid in loading stacks of plates into the dispenser.

Under one edge of the top flange surface, a stop consisting of a strip 22 of special flexible plastic is mounted. The mounting, not shown, may be by means of studs and nuts to permit easy replacement of the stop when needed. As shown in greater detail in FIG. 2, the plastic projects into the round opening 20 by an amount determined by the shape and configuration of the particular plates to be dispensed. The area of the round opening over which the strip extends has the shape of a chordal segment.

In the embodiment shown, a portion of the rim of the topmost plate is restrained at one area and the plates fan apart and tip upwardly. A substantial portion of the strip 22 lies under the top surface of the flange and it is so mounted that the rigid material of the flange limits the deflection of the strip in an upward direction. Beneath the strip, the top surface of a wall of the dispenser tube is cut away to permit full deflection of the strip in a downward direction.

Within the body of the dispenser is a cylindrical compression spring 24 to the top and bottom of which square end plates 26 are attached. The dimensions of the square end plates are such that the upper plate 26 can move vertically easily within the square body of the dispenser, permitting the spring to expand and contract in operation. The square end plates are sufficiently large that they cannot fit through the round hole in the flange, however. The length of the compression spring, its wire size and its diameter, are selected to provide spring characteristics appropriate for the specific plates to be dispensed. By a proper choice of parameters, the spring and stop can be designed to operate satisfactorily whether a full stack of plates or a depleted stack amounting to only a few remaining plates is in the dispenser.

In FIG. 2, detail of the dispenser top and flange may be seen. The flange 14 and the round opening 20 are axially aligned with the dispenser body and the posts 21 are mounted at adjacent corners of the flange opposite the side of the flange on which the stop 22 is mounted to guide stacks of plates into position during loading.

The body of the dispenser has a top surface formed by bending the top edges of three of the side walls of the square tube outwardly as at 31, 33 and 35. Beneath the surface so formed, the vertical edges of two of the side walls are bent through 90 degrees to form the square tubular enclosure as shown at 37 and 39. These vertical edges are preferably welded along their length to the remaining side walls 41 and 43.

No top surface is formed on the side wall 41, however. Rather, the flexible strip 22 is mounted beneath the flange 14 by means of a rigid flat support 45 which clamps a side of the flexible strip to the underside of the flange 14 when holding nuts 47 and 49 are tightened down on studs welded to the flange.

The flexible strip 22 is of tapered configuration and extends inwardly from its support with a substantial portion within the dispenser inside the side wall 41. A lesser portion extends into the opening 20 formed in the flange 14. It is this segment portion which contacts corresponding segment portions of the topmost one of plates loaded in the dispenser. Because the side wall 41 is cut away or relieved in the area under the strip 22, the strip is relatively unimpeded in deflecting downwardly. Conversely, because only a limited portion of the strip extends into the opening 20, upward deflection is drastically limited by the flange 14.

In practice, the dispenser is loaded by pushing a stack of plates through the round hole in the flange against the square plate 26 down into the storage tube of the dispenser. The plastic strip deflects downward easily to allow the plates to pass without placing excessive strain on the edges of the paper or plastic dishes. When the tube is filled by the stack of plates, the stack is released and the spring urges it upwardly until the portion of the topmost plate adjacent the wall 41 reaches and is restrained by the portion of the plastic strip which projects into the round hole. At this time, the peripheral edges of the topmost plates in the stack not being vertically restrained, continue to rise, causing the top several plates to fan apart upwardly. Thus, a single plate at the top of the stack may easily be grasped and a light pull either horizontally or even at a vertical angle will remove the plate. The flexible action of the plastic strip assures that no damage is done to the plate being removed and its resilient action serves to restrain the next topmost plate to be dispensed. The vertical guides mounted on the flange make certain that plates remain in alignment during dispensing as well as during loading.

In a dispenser of plates of lightweight material of a diameter of 9", the round opening may be about 9 11/16" in diameter, the flexible strip may be of 0.010" Mylar extending about one inch inwardly from the side wall 41.

The interior dimensions of the square tube body may be 9 7/16"×9 7/16", and the flange 11 3/16"×11 3/16". A coil spring of about 40" in length, wire diameter of 0.125" and outside coil diameter of 8 5/8" has proven satisfactory.

As indicated above, various modifications within the scope of the invention are contemplated. For example, the opening in the flange may be square, rectangular, oval or otherwise shaped to conform generally to the shape of the articles being dispensed.

These dimensions are merely exemplary of one version of the dispenser. They may be varied as needed in accordance with the size, weight and material of the articles being dispensed without departure from the spirit of the invention.

What is claimed is:

1. In a dispenser of individual ones of a stack of generally horizontally disposed articles, the combination of means for continuously biasing said stack of articles in a vertically upward direction toward an opening, stop means comprising a strip of flexible plastic material disposed atop said dispenser and having a surface overlying a portion of said opening and in contact with a selected first rim portion of the topmost one of said articles and normally maintaining similar selected first rim portions of said articles in close contact one with another, second rim portions of said articles opposite said selected first rim portions being urged apart by said biasing means, and means for mounting said strip of flexible material for relatively large downward deflection and relatively small upward deflection.

2. In a dispenser as defined in claim 1, the combination wherein said means for mounting said flexible member for relatively small upward deflection comprises a flange disposed adjacent the top of said dispenser, at least one part of said flange overlying said flexible member to obstruct and limit upward deflection thereof to a relatively small angle.

3. In a dispenser as defined in claim 1, the combination wherein said mounting means comprises a surface formed on a wall of said dispenser, at least one part of said surface underlying said flexible member being cut away to permit downward deflection thereof through a relatively large angle.

4. In a dispenser as defined in claim 1, the combination wherein said dispenser comprises an elongated tube, and said biasing means includes a compression spring disposed in said elongated tube, said dispenser further including a flange having said opening formed therethrough joined to the top of said tube, said strip of flexible plastic material being formed of Mylar of 0.010" thickness being mounted partially beneath said flange adjacent said opening and being deflectable downwardly through a relatively large angle and deflectable upwardly through a relatively small angle, whereby said stack of articles may be loaded into said elongated tube through said opening.

* * * * *